(12) United States Patent
Dahlgren et al.

(10) Patent No.: US 12,578,801 B2
(45) Date of Patent: Mar. 17, 2026

(54) METHOD AND DEVICE FOR DETECTING AND RESPONDING TO USER INPUT

(71) Applicant: Telefonaktiebolaget LM Ericsson (publ), Stockholm (SE)

(72) Inventors: Fredrik Dahlgren, Lund (SE); Alexander Hunt, Tygelsjö (SE); Andreas Kristensson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/015,318

(22) PCT Filed: Jul. 10, 2020

(86) PCT No.: PCT/EP2020/069601
§ 371 (c)(1),
(2) Date: Jan. 9, 2023

(87) PCT Pub. No.: WO2022/008078
PCT Pub. Date: Jan. 13, 2022

(65) Prior Publication Data
US 2023/0266827 A1     Aug. 24, 2023

(51) Int. Cl.
*G06F 3/041*     (2006.01)
*G06F 3/01*     (2006.01)
(Continued)

(52) U.S. Cl.
CPC .............. *G06F 3/017* (2013.01); *G06F 3/011* (2013.01); *G06F 3/0488* (2013.01); *G06F 3/03547* (2013.01)

(58) Field of Classification Search
CPC ........ G06F 3/017; G06F 3/011; G06F 3/0488; G06F 3/035473
See application file for complete search history.

(56) References Cited

U.S. PATENT DOCUMENTS 10,088,908 B1    10/2018 Arnall et al.
10,345,911 B2    7/2019 Mongia et al.
(Continued)

FOREIGN PATENT DOCUMENTS

CN      104750238 A      1/2015
CN      106104423 A      11/2016
(Continued)

OTHER PUBLICATIONS

International Search Report and Written Opinion of the International Searching Authority, PCT/EP2020/069601, mailed Mar. 17, 2021, 10 pages.
(Continued)

*Primary Examiner* — Jonathan M Blancha
(74) *Attorney, Agent, or Firm* — Sage Patent Group

(57)     ABSTRACT

Embodiments of the present disclosure provide a method, a computer program product, and a device for user control of device applications. The method includes detecting user input at a perimeter of the touch detection area and activating one or more determining sensors. The method includes causing seamless transition between the touch detection area and an activity domain excluding the touch detection area. The seamless transition includes causing the device to respond to user input detected by the one or more determining sensors when the detected user input transits out from the perimeter of the touch detection area. Additionally, the seamless transition includes causing the device to respond to user input from the touch detection area when the detected user input transits into the touch detection area.

16 Claims, 9 Drawing Sheets

(51) Int. Cl.
    *G06F 3/0488*      (2022.01)
    *G06F 3/0354*      (2013.01)

(56)            References Cited

U.S. PATENT DOCUMENTS

| | | | |
|---|---|---|---|
| 10,416,785 | B2 | 9/2019 | Miyazaki et al. |
| 10,585,485 | B1 | 3/2020 | Karakotsios et al. |
| 2006/0005156 | A1 | 1/2006 | Korpipaa et al. |
| 2007/0113207 | A1 | 5/2007 | Gritton |
| 2008/0192005 | A1 | 8/2008 | Elgoyhen et al. |
| 2009/0139778 | A1 | 6/2009 | Butler et al. |
| 2010/0007518 | A1 | 1/2010 | Kang |
| 2010/0141574 | A1 | 6/2010 | Jung et al. |
| 2010/0321289 | A1 | 12/2010 | Kim et al. |
| 2011/0254792 | A1 | 10/2011 | Waters et al. |
| 2011/0320978 | A1* | 12/2011 | Horodezky ........... G06F 3/0488 715/810 |
| 2012/0038542 | A1 | 2/2012 | Miyashita et al. |
| 2012/0068941 | A1 | 3/2012 | Arrasvuori et al. |
| 2012/0075202 | A1 | 3/2012 | Michaelis |
| 2012/0105346 | A1* | 5/2012 | Chen ........................ H04L 63/08 345/173 |
| 2012/0144076 | A1 | 6/2012 | Kim et al. |
| 2012/0235925 | A1 | 9/2012 | Bauducco et al. |
| 2012/0306903 | A1 | 12/2012 | Griffin |
| 2014/0006830 | A1* | 1/2014 | Kamhi .................. G06F 1/3206 713/324 |
| 2014/0092011 | A1 | 4/2014 | De Foras et al. |
| 2014/0111423 | A1 | 4/2014 | Park et al. |
| 2014/0143784 | A1 | 5/2014 | Mistry et al. |
| 2014/0152559 | A1 | 6/2014 | Chen |
| 2014/0267142 | A1 | 9/2014 | Macdougall et al. |
| 2014/0320434 | A1 | 10/2014 | Pantel |
| 2014/0375539 | A1* | 12/2014 | Gabara ................ G06V 40/113 345/156 |
| 2016/0098137 | A1 | 4/2016 | Kim et al. |
| 2016/0224235 | A1 | 8/2016 | Forsstrom et al. |
| 2016/0231835 | A1 | 8/2016 | Chen et al. |
| 2016/0266652 | A1 | 9/2016 | Son et al. |
| 2016/0351047 | A1 | 12/2016 | Han et al. |
| 2017/0147125 | A1 | 5/2017 | Jiang et al. |
| 2017/0322665 | A1 | 11/2017 | Shim et al. |
| 2017/0329449 | A1 | 11/2017 | Sherry |
| 2017/0372172 | A1 | 12/2017 | Starns et al. |
| 2018/0088797 | A1 | 3/2018 | McAtee et al. |
| 2018/0188894 | A1 | 7/2018 | Feinstein |
| 2018/0188943 | A1* | 7/2018 | Morita .................... G06F 3/042 |
| 2018/0239429 | A1 | 8/2018 | Agarwal et al. |
| 2020/0064996 | A1 | 2/2020 | Giusti |
| 2021/0042026 | A1 | 2/2021 | Anbalagan et al. |

FOREIGN PATENT DOCUMENTS

| | | |
|---|---|---|
| CO | 6920259 A2 | 4/2014 |
| EP | 2515201 A1 | 10/2012 |
| EP | 2652580 A1 | 10/2013 |
| EP | 2128748 A2 | 5/2018 |
| EP | 3343326 A2 | 7/2018 |
| JP | 2015125670 A | 7/2015 |
| JP | 2016057779 A | 4/2016 |
| KR | 2011/0078645 A | 7/2011 |
| WO | 2011088579 A1 | 7/2011 |
| WO | 2014140827 A2 | 9/2014 |
| WO | WO 2015/102974 A1 | 7/2015 |
| WO | 2022008078 A1 | 1/2022 |

OTHER PUBLICATIONS

International Search Report and Written Opinion of the International Searching Authority, PCT/EP2020/069533, mailed Mar. 16, 2021, 13 pages.
International Search Report and Written Opinion of the International Searching Authority, PCT/EP2020/069514, mailed Mar. 15, 2021, 9 pages.
Goode, L., "Touchless Gesture Controls on Phones? Think Bigger," Gear, Aug. 12, 2019, https://www.wired.com/story/gesture-controls-phones-samsung-lg-google/ 12 pages.
"Infineon's innovative XENSIV™ 60 GHz radar chip enables things to see and revolutionizes the Human Machine Interface," Infineon Technologies, 2016, https://www.infineon.com/cms/en/product/promopages/60GHz/ 8 pages.
Office Action, JP Patent Application No. 2023-501204, mailed Mar. 25, 2024, 8 pages.
Office Action, IN Patent Application No. 202317002279, mailed Apr. 2, 2024, 7 pages.
Non-Final Office Action mailed Aug. 7, 2025 for U.S. Appl. No. 18/015,323, 13 pages.
Office Action, Search Report Patentability Examination, Columbian Patent Application No. NC2023/0000513, mailed Dec. 2, 2025, 9 pages.

* cited by examiner

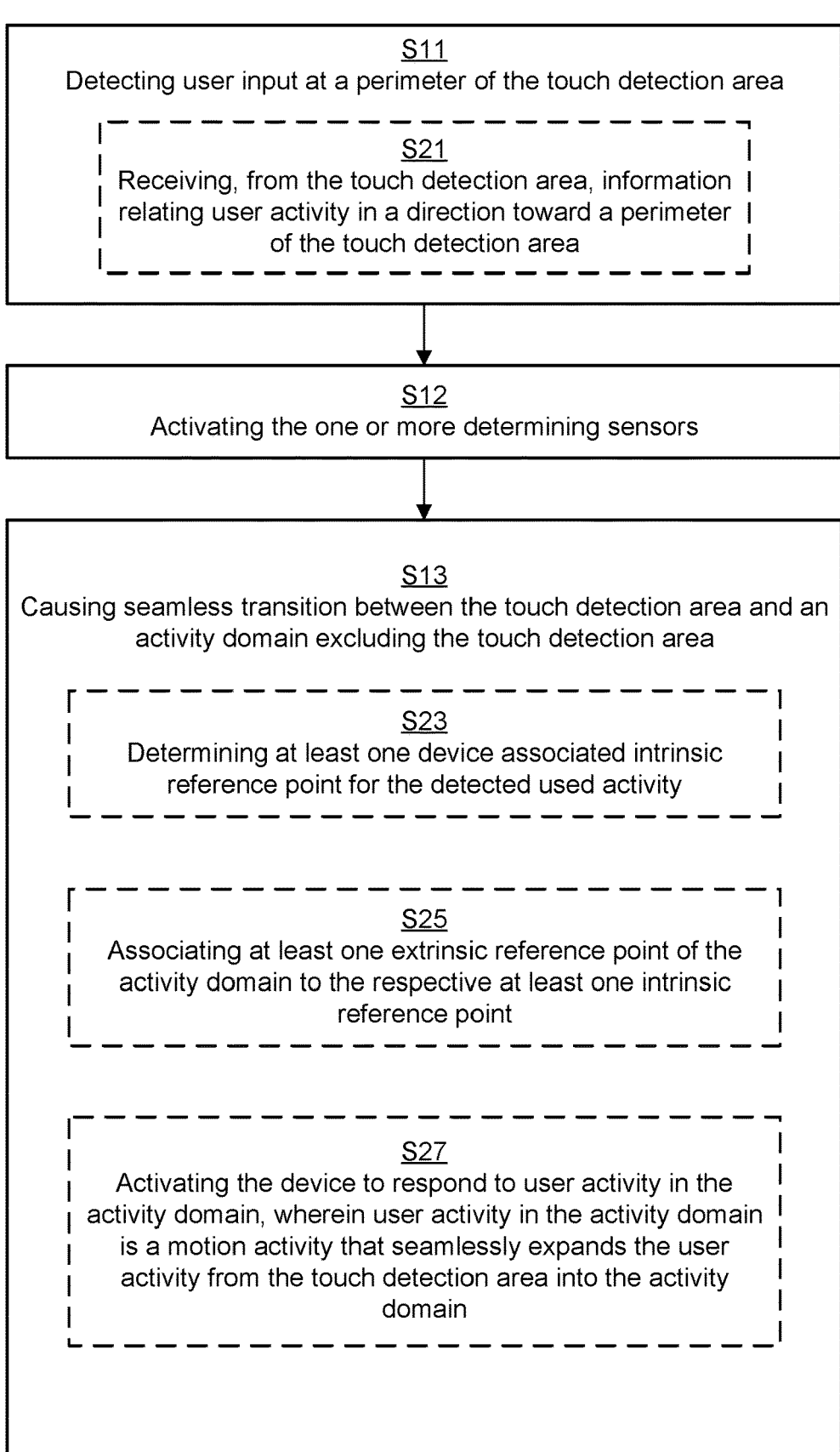

S11
Detecting user input at a perimeter of the touch detection area

S21
Receiving, from the touch detection area, information relating user activity in a direction toward a perimeter of the touch detection area

S12
Activating the one or more determining sensors

S13
Causing seamless transition between the touch detection area and an activity domain excluding the touch detection area

S23
Determining at least one device associated intrinsic reference point for the detected used activity

S25
Associating at least one extrinsic reference point of the activity domain to the respective at least one intrinsic reference point

S27
Activating the device to respond to user activity in the activity domain, wherein user activity in the activity domain is a motion activity that seamlessly expands the user activity from the touch detection area into the activity domain

FIG. 3B

METHOD AND DEVICE FOR DETECTING AND RESPONDING TO USER INPUT

CROSS REFERENCE TO RELATED APPLICATIONS

This application is a 35 U.S.C. § 371 national stage application of PCT International Application No. PCT/EP2020/069601 filed on Jul. 10, 2020, the disclosure and content of which is incorporated by reference herein in its entirety.

TECHNICAL FIELD

The present disclosure relates to a method and device for receiving user input. In particular, the disclosure relates to a method and device for receiving user input and/or exercising user control using a virtual touch control interface.

BACKGROUND

Over the last decade, so called touchscreens or touch panels, i.e., user interfaces activated through physical touching, are widely applied in various electronic products in all aspects of peoples work and life. Physical touchscreen functionality is today commonly used for smartphones, tables, smart watches or similar devices; but physical touchscreen functionality is also widely used in other types of commercial and non-commercial products incorporating larger size display areas, e.g., computer displays, television displays, control room displays, and similar.

The physical touchscreens provide input and display technology by combining the functionality of a display device and a touch-control device. There are a variety of touch-control technologies to enable user control through a touch control interface, e.g., using resistive, capacitive, infrared, and electromagnetic sensors and technologies.

User control through a physical touchscreen comprises touching a display area with one or several fingers or using an appliance specifically adapted for use on a touch display, e.g., a pen.

Using commercially available physical touchscreen solutions, touch input is limited by the size of the display. For example, in a situation when scrolling through content presented on the display, the scrolling is limited by the size of the display. Scrolling may be exact but limited to moving the finger to the end of the display after which the scrolling stops, or expanded by moving the finger fast and lifting it means that the scrolling acts like rolling a wheel. When needing to scroll a long range, a more intuitive user interface would be beneficial.

US2014/0267142 A1 introduces the concept of an expanded user input area that provides an intuitive user interface for accessing content. The proposed solution introduces a transition area that is simultaneously detectable by at least two different sensors; at least one sensor capable of detecting on screen input and another sensor capable of detecting off screen input. The proposed solution overcomes the limitations seen in commercially available physical touchscreen solutions, but the proposed multi-sensor technology increases the energy consumption of the wireless device.

Consequently, there is a need for improvement of the currently available solutions.

SUMMARY

It is therefore an object of the present disclosure to provide a method, a computer program product, and a device for receiving user input, which seeks to mitigate, alleviate, or eliminate all or at least some of the above-discussed drawbacks of presently known solutions.

This and other objects are achieved by means of a method, a computer program product, and a device as defined in the appended claims. The term exemplary is in the present context to be understood as serving as an instance, example or illustration.

According to a first aspect of the present disclosure, a method for receiving user input in a device comprising a touch detection area and one or more determining sensors arranged to determine a position or relative movement of user input at least outside said touch detection area is provided. The method comprises detecting user input at a perimeter of the touch detection area and activating the one or more determining sensors. The method further comprises causing seamless transition between the touch detection area and an activity domain excluding the touch detection area. The seamless transition comprises causing the device to respond to user input detected by the one or more determining sensors when the detected user input transits out from the perimeter of the touch detection area or causing the device to respond to user input from the touch detection area when the detected user input transits into the touch detection area.

Advantageously, the proposed method can be used to provide a user input domain, i.e., activity domain that is larger than the physical size of the device or the physical size of the touch detection area. The proposed method provides a user interface, UI, to interact outside the physical touch detection area; with which UI the user can interact and control various applications in the device. Thus, the proposed method allows user input also in an activity domain that excludes the touch detection area and which is activated when a user provides user input that reaches the perimeter of the touch detection area of the device. Thus, the activity domain may be used as a natural, intuitive extension to the physical touch display without unduly reducing the power efficiency of the device. Furthermore, the disclosure provides the advantage of reducing the risk of inadvertent user input prior to an intended transition into the activity domain.

In some embodiments, detecting user input at a perimeter of the touch detection area comprises receiving, from the touch detection area, information relating to user activity in a direction toward a perimeter of the touch detection area.

In some embodiments, causing seamless transition between the touch detection area and an activity domain excluding the touch detection area comprises determining at least one device associated intrinsic reference point for the detected user activity, wherein the device associated intrinsic reference point is determined in a device reference system and the user activity is a touch activity performed on the touch detection area. The method further comprises associating at least one extrinsic reference point of the activity domain, i.e., extrinsic domain, to the respective at least one intrinsic reference point and activating the device to respond to user activity in the activity domain. User activity in the activity domain, i.e., extrinsic domain, is a motion activity that seamlessly expands the user interface from the touch detection area into the activity domain.

Thus, with the disclosed method, the device may detect user activity, such as the position and/or movement of one finger or several fingers moving from the intrinsic domain (i.e., associated with physical boundary of touch detection area) out into the activity domain, i.e., extrinsic domain. The disclosed method is based on expanding the user interface into an activity domain, a virtual touch zone, in response to movements on the physical touch detection area (e.g. the physical display). For example, when the user performs a gesture along the touch detection area towards the perimeter of the touch detection area, the determining sensors are activated, and the movement of the fingers in an activity domain are tracked by the determining sensor, e.g., motion detection sensors.

In some embodiments, the method comprises enabling user control of one or more device applications based on user activity and presenting the user activity on a display connected to the touch detection area.

In some embodiments, user activity comprises web-browsing, list scrolling, moving a cursor on the display, and activating functionality associated with device applications.

Thus, movement of the fingers outside the touch detection area may be tracked and those movements are used as further input to application(s), menu navigation and control of applications in the device.

Moreover, the embodiments of disclosure can be readily implemented in wireless devices such as a smart phone, a handheld device, a user equipment, a smart watch or the like.

According to a second aspect of the present disclosure, there is provided a computer program product comprising a non-transitory computer readable medium, having thereon a computer program comprising program instructions. The computer program is loadable into a data processing unit and configured to cause execution of the method according to the first aspect when the computer program is run by the data processing unit.

Further according to a third aspect of the present disclosure, there is provided a device comprising a touch detection area, one or more motion detection sensors, and processing circuitry. The processing circuitry is configured to detect user input at a perimeter of the touch detection area and to activate the one or more determining sensors. The processing circuitry is further configured to cause seamless transition between the touch detection area and an activity domain excluding the touch detection area when transitioning between the perimeter and the activity domain excluding the touch detection area. The seamless transition comprises causing the device to respond to user input detected by the one or more determining sensors when the detected user input transits out from the perimeter of the touch detection area or causing the device to respond to user input from the touch detection area when the detected user input transits into the touch detection area.

In some embodiments, the device receives, from the touch detection area, information relating user activity in one or more predetermined subareas of the touch detection area. The processing circuitry is further configured to determine a device associated intrinsic reference point for the detected user activity, wherein the device associated intrinsic reference point is determined in a device reference system and is located within an intrinsic domain corresponding to the physical boundaries of the device. This allows that a much larger area than the area limited by the physical size of the display, can be used when using the device. Additionally, the processing circuitry is configured to receive, from at least one of the one or more motion detection sensors, information relating to user activity in the activity domain, i.e., an extrinsic domain of the device reference system excluding the intrinsic domain, determine a device associated extrinsic reference point for the detected user activity in the activity domain, associate the extrinsic reference point to the intrinsic reference point and activate the device to respond to user activity detected by the one or more determining sensors, e.g., motion detection sensors.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

An advantage of some embodiments is an enablement of user input through a larger activity domain than the touch area that is limited by the physical size of the display, at the same time as the risk of inadvertent user input, e.g., mistaking hand movements next to the phone as input control, is minimized.

Another advantage of some embodiments is that the user interface, UI, is intuitive, so that the activity domain excluding the physical touch display is experienced as a very natural extension to the physical touch display.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3B is a flowchart illustrating example method steps for receiving user input in a device;

DETAILED DESCRIPTION

Figure 1:
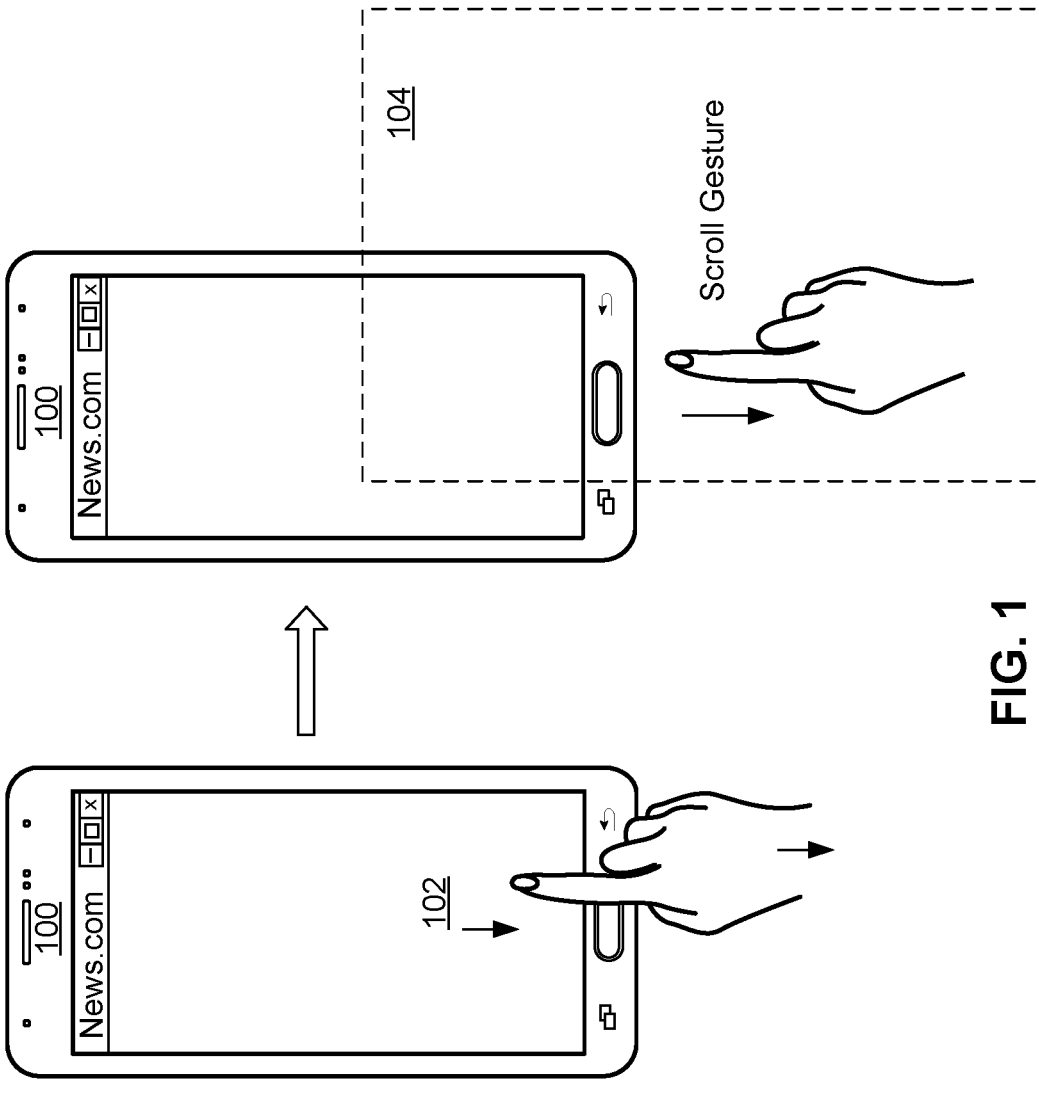
FIG. 1 discloses an example provisioning of user input to a wireless device application.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates an example scenario for user control of a device application, whereby a user is capable of providing user input to a device 100, e.g., a wireless device, in an expanded user interface comprising a touch detection area 102 and an activity domain comprised in a surrounding space of the device, i.e., excluding the device. In some examples, the activity domain will be activated on one or more sides of the device, e.g., on a side corresponding to an expansion of the touch detection area in a direction corresponding to a scrolling operation on the touch detection area. As will be explained in detail in the following description, the present disclosure enables an energy efficient, seamless expansion of a user interface to the device. The seamless expansion may be performed by transitioning between a touch detection area 102 and an activity domain 104 outside the touch detection area. As exemplified in FIG. 1, the device 100 can be a smart phone, or any other type of touch activated electronic device, e.g., a tablet, a user equipment, a smartwatch or the like. The device 100 includes a touch detection area 102, which may comprise a touch panel configured to receive user input by means of one or more pointers, e.g., fingers, touch pen or other type of touch devices. User input includes various gestures such as but not limited to a touch gesture, a scroll gesture, a pinch gesture, a drag gesture, a swipe gesture, or the like which are performed on the touch detection area 102 of the device 100.

In the scenario of FIG. 1, the user may perform a swipe gesture on the touch detection area 102 while browsing in the device 100 and the swipe gesture is performed in a direction out of the touch detection area 102 to an activity domain 104 below the touch detection area 102, i.e., to an activity domain 104 excluding the touch detection area 102. Further, the device 100 may be configured to cause seamless browsing for the user and content in the browser may be scrolled automatically in accordance with the swipe gesture in the activity domain 104. The user performs the scroll gesture in the activity domain 104, which allows the device 100 to display scrolled content according to the activity domain 104 scroll gesture in the browser.

Figure 2:
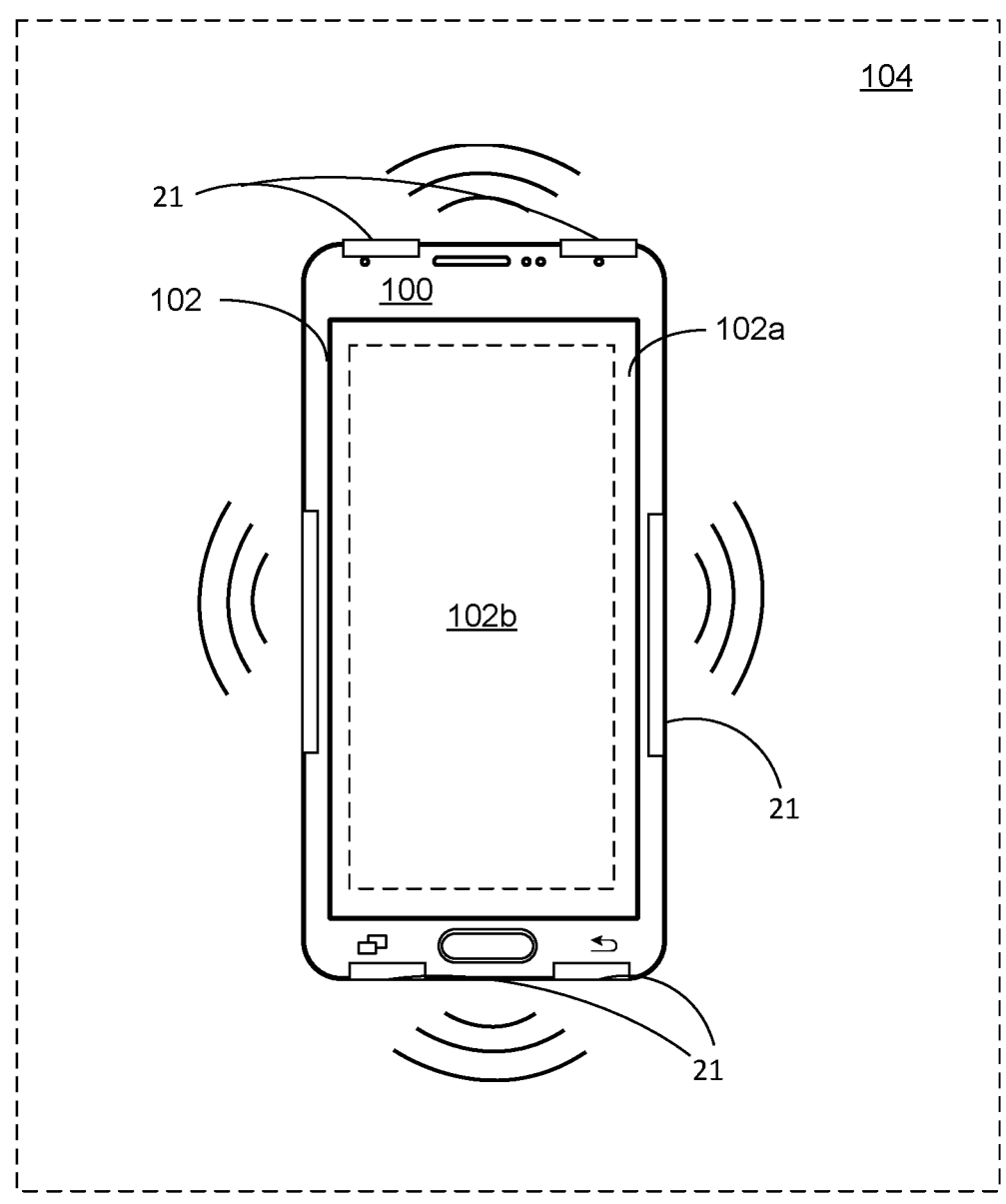
FIG. 2 illustrates an example device with determining sensors.

FIG. 2 illustrates a device 100, here illustrated as a smart phone, comprising a touch detection area 102, and one or more determining sensors 21, e.g., motion detection sensors, configured to respond to user input in an activity domain 104 excluding the touch detection area 102. The smart phone comprises processing circuitry configured to detect user input at a perimeter 102a of the touch detection area 102, e.g., from touch detection sensors within a perimeter 102a. The touch detection area 102 may be fully comprised within a display area of the device, or may be extended beyond the display to also comprise an area bordering the display. In some examples, the touch detection area 102 may also be configured with physical or virtual buttons along the perimeter 102a. The device is configured for seamless transition between the touch detection area 102 and an activity domain 104 excluding the touch detection area 102 when providing touch input at the perimeter 102a in a movement from the touch detection area 102 into the activity domain 104. In response to detecting user input at the perimeter 102a of the touch detection area 102, one or more determining sensors 21 are activated to respond to activities in the activity domain 104, e.g., responding to motion performed in the activity domain 104. Thus, a seamless transition occurs causing the device 100 to respond to user input detected by the one or more determining sensors 21 when the detected user input transits out from the perimeter 102a of the touch detection area 102 or causing the device to respond to user input from the touch detection area 102 when the detected user input transits into the touch detection area 102.

The determining sensors 21 may be provided directly adjacent to the touch detection area 102 or said perimeter 102a of the touch detection area 102, or along an edge of the device itself. The determining sensors 21 are activated or deactivated in response to receiving user input at the perimeter 102a of the touch detection area 102, e.g., input by means of hand(s), finger(s), a pen or the like. Activating the determining sensors 21 comprises activating the sensors from a low energy state, e.g., a state where the determining sensors 21 are completely powered off or a state when the determining sensors 21 are maintained in a stand-by state. Thus, the determining sensors 21 are maintained in a low energy state until receiving an activating user input. Thus, the determining sensors 21 may be used to detect the motion of objects within an activity domain surrounding the touch detection area 102, e.g., to respond to user input in an activity domain 104 excluding the touch detection area 102. Once activated, the determining sensors 21 may continuously track user input, e.g., gestures or other movements of the finger(s), performed outside the touch detection area 102. In some examples, the determining sensors 21 comprise motion detection sensors and are selected from a group of sensors comprising image detection sensors, radar sensors, lidar sensors, ultra-sonic sound detection sensors, and infrared light detection sensors.

Figure 3A:
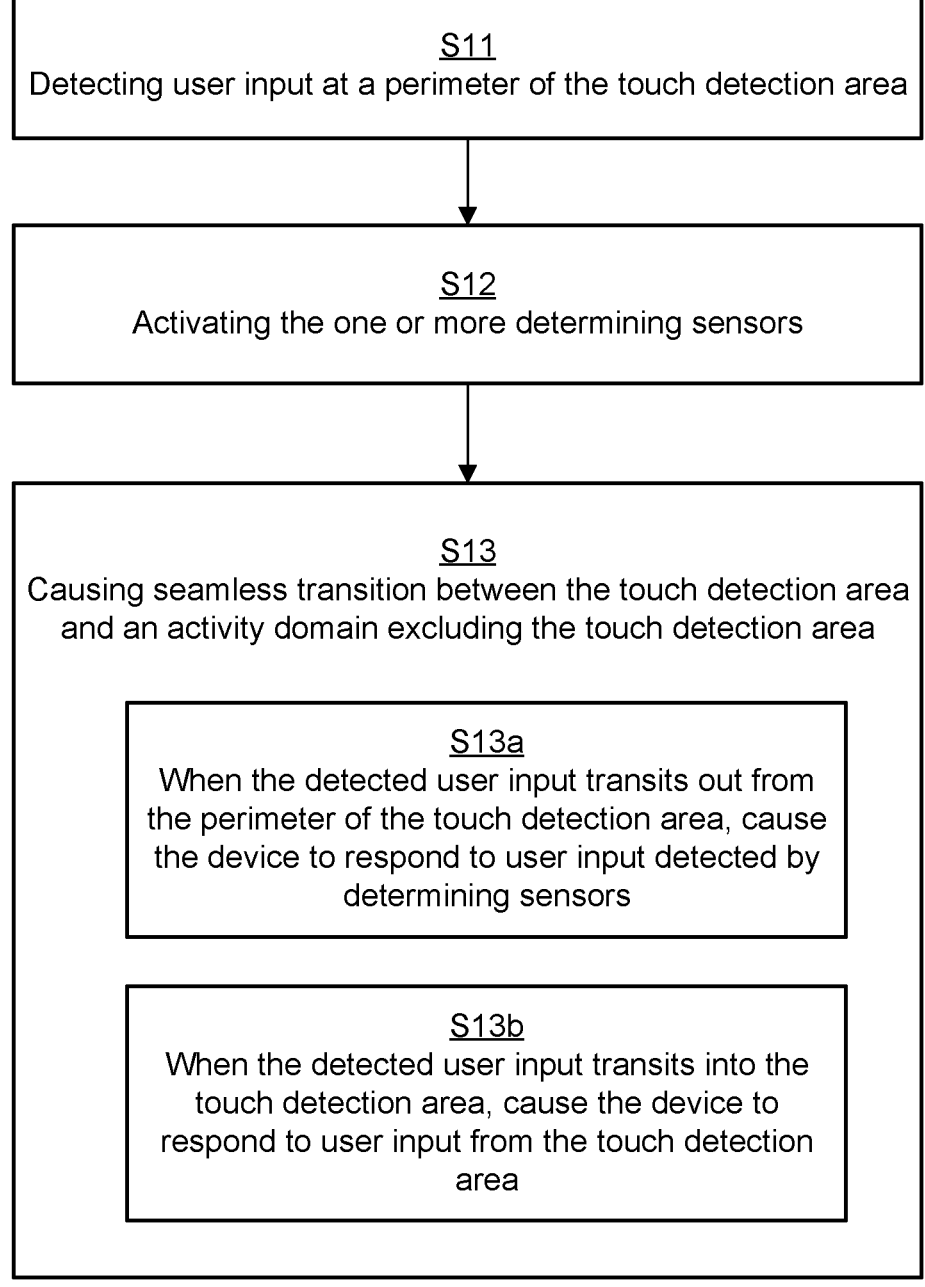
FIG. 3A is a flowchart illustrating example method steps for receiving user input in a device.

FIG. 3A discloses a flowchart illustrating example method steps implemented in a device 100, e.g., a wireless device. At step S11, the method comprises detecting user input at a perimeter 102a of the touch detection area 102. For example, the user input includes a swipe gesture, a drag gesture, a pinch gesture, or the like which are performed in a direction toward a perimeter 102a of the touch detection area 102. Further, the user input may be performed with one finger, multiple fingers, or a pointer device. The touch detection area 102 may include a display of the device 100, but may also be expanded to cover areas also outside of the display. In some examples, the touch detection area 102 may extend over an edge of the display, so that the perimeter 102a of the touch detection area 102 represents an area outside the display. In the example scenario, the touch detection area 102 may comprise touch activated input devices, e.g., one or more buttons bordering the display. In some examples, the step of detecting user input at a perimeter 102a of the touch detection area 102 comprises receiving information relating to user activity in a direct toward a perimeter 102a of the touch detection area 102.

The method further comprises activating (S12) the one or more determining sensors 21, i.e., activating the one or more determining sensors 21 in response to the detected user input. Activation of the determining sensors 21 may comprise activating the sensors as a direct consequence of detecting user input at a perimeter 102a of the touch detection area 102, but may also require receipt of information relating to user activity in a direction toward the perimeter 102*a* in order to avoid inadvertent activation of the determining sensors 21. A combination of input relating to user activity in a direction toward the perimeter 102*a* and user input at the perimeter 102*a* may be invoked when the determining sensors 21, configured to determine user input from the activity domain 104, require a setup time more than a few ms. Sensor activation based on said combination may also be used to further ensure that there is a desire to invoke the expanded user interface, i.e., to reduce the risk of inadvertent activation. Such inadvertent activation of the determining sensors 21 would not only result in an undue power consumption within the device, but may also result in faulty user input to the wireless device. Thus, mechanisms for ensuring that user input from within the activity domain 104 is only enabled following decisive user input.

At step S13, the method comprises causing seamless transition between the touch detection area 102 and an activity domain 104 outside the touch detection area 102, i.e., excluding the touch detection area 102. For example, when the user performs a swipe gesture on the touch detection area 102 and if the fingers of the user leaves the touch detection area 102 and enters the activity domain 104, the device allows a seamless transition between the touch detection area 102 and the activity domain 104.

In an embodiment, causing the seamless transition between the touch detection area 102 and the activity domain 104 comprises causing the device to respond to the user input detected by the determining sensors 21 when the detected user input transits out from the perimeter 102*a* of the touch detection area 102 at step S13*a*, e.g., when the user is browsing in the device 100 and performs a swipe gesture to scroll through the content. In a case involving scrolling of content, if one or more fingers of the user are moved toward a perimeter 102*a* of the touch detection area 102, touching the perimeter 102*a* of the touch detection area 102, thereby activating the determining sensors 21, and entering the activity domain 104. As a consequence, a seamless transition during scrolling of the content is provided for. That is, the device detects the continuation of the swipe gesture in the activity domain 104 by means of the determining sensors 21 and allows the content to be scrolled. Consequently, the device 100 allows for a seamless transition of scrolling of content from the touch detection area 102 to the activity domain 104.

In an embodiment, causing the seamless transition between the touch detection area 102 and the activity domain 104 includes causing the device 100 to respond to user input from the touch detection area 102 when the detected user input transits into the touch detection area 102 at step S13*b*. For example, when scrolling through the content with a swipe gesture in the activity domain 104, if the fingers of the user enters the perimeter 102*a* of the touch detection area 102, then the device 100 allows a seamless transition from scrolling of the content within the activity domain 104 to a scrolling operation performed using the touch detection area 102. That is, the device detects the swipe gesture transition into the touch detection area 102 and allows the content to be continuously scrolled as initiated by the swipe gesture previously performed in the activity domain 104. Thus, when the detected user input transits into the touch detection area 102 from a space excluding the touch detection area 102, i.e., the activity domain 104, seamless transition from the activity domain 104 into the touch detection area 102 is supported.

FIG. 3B discloses a flowchart further illustrating example method steps implemented in a device 100, wherein the step of detecting S11 user input at a perimeter 102*a* of the touch area comprises receiving S21, from the touch detection area 102, information relating user activity. Thus, at step S21, the method comprises receiving from the touch detection area 102, information relating user activity in a direction toward a perimeter 102*a* of the touch detection area 102. Such user activity may comprise web-browsing, list scrolling, moving a cursor on the display, activating functionality associated with computer applications, or the like. The information relating to user activity may include a user input such as a swipe gesture, a scroll gesture or the like towards the perimeter 102*a* of the touch detection area 102. The user input is received from the touch detection area 102 on the device 100.

At step S12, one or more determining sensors 21, e.g., motion detection sensors, are activated. The determining sensors 21 are activated when reaching the perimeter 102*a* of the touch detection area 102, i.e., following a detected user input at a perimeter 102*a* of the touch detection area 102. The determining sensors 21 may be activated to register user movement and/or to receive user input. For example, when the user performs a swipe gesture on the touch detection area 102, e.g., from the top of the touch detection area 102 to a perimeter 102*a* section at the bottom of the touch detection area 102, the determining sensors 21 are activated when the swipe gesture of the user reaches the perimeter 102*a* of the touch detection area 102. The swipe gesture to the perimeter 102*a* of the touch detection area 102 activates the motion detection sensors 21 to monitor and/or to track the movement of the fingers away from the touch detection area 102.

In some examples, the step of causing seamless transition between the touch detection area 102 and the activity domain 104, an area outside the touch detection area 102, when transitioning between the perimeter 102*a* and the activity domain 104 may be implemented by associating an intrinsic reference point of the device to an extrinsic reference point in the activity domain, i.e., an extrinsic domain of the device. Thus, the method may comprise determining at least one device associated intrinsic reference point for the detected user activity at step S23 in a device reference system. In an embodiment, the device reference system may be a one-, two- or three-dimensional reference system. For example, the reference system of the device 100 comprises an intrinsic domain, which corresponds to the physical boundaries of the device 100 and activity domain, i.e., the extrinsic domain that excludes the intrinsic domain.

The intrinsic reference point is associated with the touch-screen area 102 of the device 100. The user activity on the touch detection area 102 is determined. For example, when the user performs a swipe gesture on the touch detection area 102 from the top of the touch detection area 102 to the perimeter 102*a* of the touch detection area 102, the intrinsic reference point corresponds to a point on the perimeter 102*a*, at which point the finger performing the swipe gesture transits out of the touch detection area 102. Thus, the intrinsic reference point denotes a reference point within a reference system associated with the device 100 and more specifically a reference point within the touch detection area 102.

At step S25, the method comprises associating at least one extrinsic reference point of the activity domain, i.e., the extrinsic domain, to the respective at least one intrinsic reference point. The extrinsic reference point is a point within a space excluding the touchscreen area 102 of the device 100. Thus, the intrinsic reference point from the touch detection area 102 is mapped to an extrinsic reference point in an activity domain 104 excluding the touch detection area 102.

At step S27, the method comprises activating the device 100 to respond to user activity in the activity domain 104, i.e., the extrinsic domain. The user activity in the activity domain 104 is a motion activity that seamlessly expands the user activity from the touch detection area 102 into an expanded activity domain 104. When the user activity (i.e., a swipe gesture) expands from the intrinsic domain to the activity domain 104, i.e., the extrinsic domain, the device 100 seamlessly starts to respond to the user input within the activity domain 104. In an example scenario, the user may perform a swipe gesture on the touch detection area 102 while browsing on a webpage on the device; the swipe gesture of the user may then be continued from the touch detection area 102 to the activity domain 104, i.e., to the extrinsic domain, to thereby allow continued browsing in accordance with a gesture in the activity domain 104. Thus, the proposed method allows the seamless expansion of the touch detection area 102 where the user can perform touch gestures to move away from the touch detection area 102, while maintaining the ability to interact and/or control one or more applications in the device 100.

Turning back to FIG. 2, a device 100 comprising a touch detection area 102, and one or more determining sensors 21 is disclosed. The device comprises processing circuitry configured to detect user input at a perimeter 102*a* of the touch detection area 102, e.g., by means of sensor information received from the determining sensors 21, and to cause seamless transition between the touch detection area 102 and an activity domain 104 excluding the touch detection area 102 when transitioning from the perimeter 102*a* into the activity domain 104. Seamless transition comprises causing the device 100 to respond to user input detected by the one or more determining sensors 21 when the detected user input transits out from the perimeter 102*a* of the touch detection area 102 or causing the device to respond to user input from the touch detection area 102 when the detected user input transits into the touch detection area 102.

The determining sensors 21 may be arranged within a perimeter 102*a* of the touch detection area 102 or within a perimeter 102*a* of the device itself but outside of the touch detection area 102. The determining sensors 21 are activated when user input, e.g., input by means of hand(s), finger(s), a pen or the like, on the touch detection area 102 reaches the perimeter 102*a* of the touch detection area 102. Further, the sensors of the touch detection area 102 are configured to detect movement of objects across the perimeter 102*a* of the touch detection area 102. The determining sensors 21 may be used to detect motion and location of objects surrounding the touch detection area 102, e.g., to control of various applications in the device 100. These determining sensors 21 continuously track the movements of the finger(s) when the user performs gestures outside the touch detection area 102. The determining sensors 21 may be automatically deactivated, or receipt of input from the sensors may be deactivated, when the gestures transit into the touch detection area 102 from the area outside the touch detection area 102.

The processing circuitry may be configured to receive user input from the determining sensors 21 arranged at the edge of the device. The processing circuitry is further configured to cause seamless transition between the touch detection area 102 and an activity domain excluding the touch detection area 102, i.e., an area outside the touch detection area 102, when transitioning over the perimeter 102*a*. The processing circuitry is also configured to cause the device to respond to user input detected by the one or more determining sensors 21 when the detected user input transits out from the perimeter 102*a* of the touch detection area 102, and to cause the device to respond to user input detected by the one or more determining sensors 21 when the detected user input transits out from the perimeter 102*a* of the touch detection area 102. The determining sensors 21 in the device 100 may be configured with a sensing angle (e.g., 30° or 60°) within which the determining sensors 21 can monitor and/or track the movement of the objects, which are external to the touch detection area 102 of the device 100. The sensing angle for monitoring and/or tracking the movement of the objects may be configurable in accordance with the application requirements at the device 100.

Thus, the device configuration and operation allow use of a much larger user input activity domain 104 than the area limited by the physical size of the touch detection area 102 when operating the device. The determining sensor 21, e.g., motion detection sensors, may be placed so that they can detect objects surrounding the sides of the device 100 at a certain, predetermined angle, or anywhere in an activity domain 104 surrounding the device and excluding the touch detection area 102. Thus, the device 100 will be capable of detecting user activity, such as the position and/or movement of one finger or several fingers moving from the touch detection area 102, out into the activity domain 104, i.e., the extrinsic domain representing a space outside of the boundaries of the device 100.

The disclosure presents a solution for activating and controlling an activity domain 104 excluding the touch detection area 102 or space as extensions to natural movements on the physical touch detection area 102, e.g. screen or display. This expansion feature may be activated as a natural extension of the movement, moving beyond the limit of the physical touch detection area 102. For example, a finger points at a place on the touch detection area 102. When the finger is moved along the display towards the perimeter 102*a*, i.e., border of the touch detection area 102, the determining sensors 21 are activated. Up until the moment when the determining sensors 21 are activated, the determining sensors 21 are operated in a low energy, battery preserving mode. As soon as the movement of the finger continues further out in the activity domain 104 beyond the physical border, the movement is recognized as an extension of the movement on the touch detection area 102 and interpreted as if the finger moved further out on a larger touch detection area 102. The tracking may be used as further input to the application and menu navigation, meaning that the finger can continue to move around in the air outside the device 100, along the same plane with some acceptable angle, and this is continuously tracked.

The processing circuitry may further be configured to receive, from the touch detection area 102, information relating user activity in one or more predetermined subareas of the touch detection area 102. The processing circuitry is further configured to determine a device associated intrinsic reference point for the detected user activity, wherein the device associated intrinsic reference point is determined in a device reference system and is located within an intrinsic domain 102 corresponding to the physical boundaries of the device 100. Additionally, the processing circuitry is configured to receive, from at least one of the one or more determining sensors 21, e.g., motion detection sensors, information relating to user activity in an activity domain 104, i.e., extrinsic domain, of the device. The activity domain 104, i.e., extrinsic domain, excludes the touch detection area 102 that may be represented in an intrinsic domain corresponding to the boundaries of the wireless device. A device associated extrinsic reference point for the detected user activity in the activity domain 104 may be associated to an intrinsic reference point corresponding to touch activity at the perimeter 102a of the device. The seamless transition from the touch detection area 102 to the activity domain 104, cause the device to respond to user activity detected by the one or more determining sensors 21.

Figure 4:
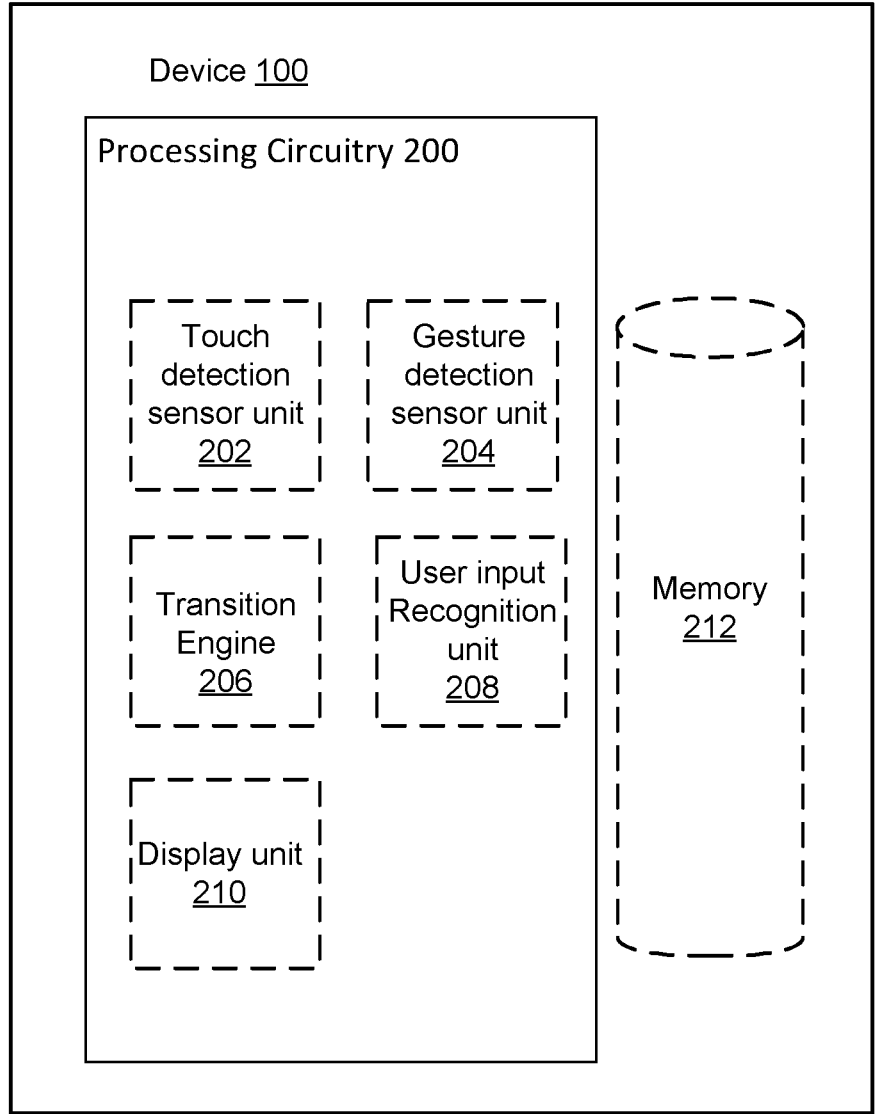
FIG. 4 illustrates an example block diagram of a device.

FIG. 4 illustrates a schematic block diagram illustrating an example configuration of a device 100, e.g., a wireless device implementing the above disclosed method. The example configuration enables seamless transition between a touch detection area 102 and an activity domain 104, i.e. an area or volume outside the touch detection area 102. As depicted in FIG. 4, the device 100 processing circuitry 200 and a memory 212. The processing circuitry includes a touch detection sensor unit 202, a gesture detection sensor unit 204, a transition engine 206, a gesture recognition unit 208, a display unit 210.

In some examples, the touch detection sensor unit 202 may include touch sensors, capacitive sensors or the like for tracking movement of fingers on the touch detection area 102. The gesture detection sensor unit may include one or more determining sensor 21, e.g., motion detection sensors, for detecting gestures external to the touch detection area 102, i.e., gestures performed in the activity domain 104. The gesture detection sensor unit 204 may be configured to continuously track gestures performed outside the touch detection area 102, i.e., in the activity domain 104.

The user input recognition unit 208 may be configured to recognize user input on the touch detection area 102 and within the activity domain 104, e.g., a gesture performed within a space outside the touch detection area 102. For example, the user input recognition unit 208 may be configured to recognize the gesture as a touch gesture, a swipe gesture, a pinch gesture, a drag gesture, a rotate gesture or the like. Thus, the user input recognition unit 208 may be configured to identify user input on the touch detection area 102 and within the activity domain 104 of the device 100.

In an embodiment, the a plurality of gestures may be registered in a memory 212 of the device 100. For example, various user gestures such as but not limited to a touch gesture, a swipe gesture, a pinch gesture, a drag gesture, a rotate gesture, a zoom gesture, a tap gesture, a double tap gesture or the like may be stored in the memory 212 and a user input interpretation may be associated with each gesture. The user input recognition unit 204 may be communicatively coupled to the memory 212 so that the user input recognition unit 208 may interpret a user input by matching a gesture with the plurality of stored gestures.

In an embodiment, the transition engine 206 may be configured to cause seamless transition between the touch detection area 102 and activity domain 104 when the user input transitions between the perimeter 102a and activity domain 104. When the user input transits out from the perimeter 102a of the touch detection area 102, the transition engine 208 may be configured to cause the device 100 to respond to the user input. For example, when the user performs a swipe gesture on the touch detection area 102 while browsing in the device 100 and the swipe gesture expands away from the touch detection area 102 to the activity domain 104, then the transition engine 206 may be configured to cause seamless browsing for the user and the contents in the browser are scrolled automatically in accordance with the swipe gesture in the area outside the touch detection area 102.

In another embodiment, when the detected user input transits into the touch detection area 102, the transition engine 206 may be configured to cause the device 100 to respond to the user input from the touch detection area 102. For example, when the swipe gesture enters the touch detection area 102 from the activity domain 104, then the transition engine 206 may be configured to cause seamless browsing for the user and the contents in the browser are scrolled automatically in accordance with the swipe gesture in the touch detection area 102.

The processing circuitry 200 may be configured to extract one or more instructions from the memory 212 and execute the one or more instructions for enabling the device to cause seamless transition between the touch detection area 102 and activity domain 104.

A display unit 210 may be configured to visually reflect an application or web browser content.

Figure 5:
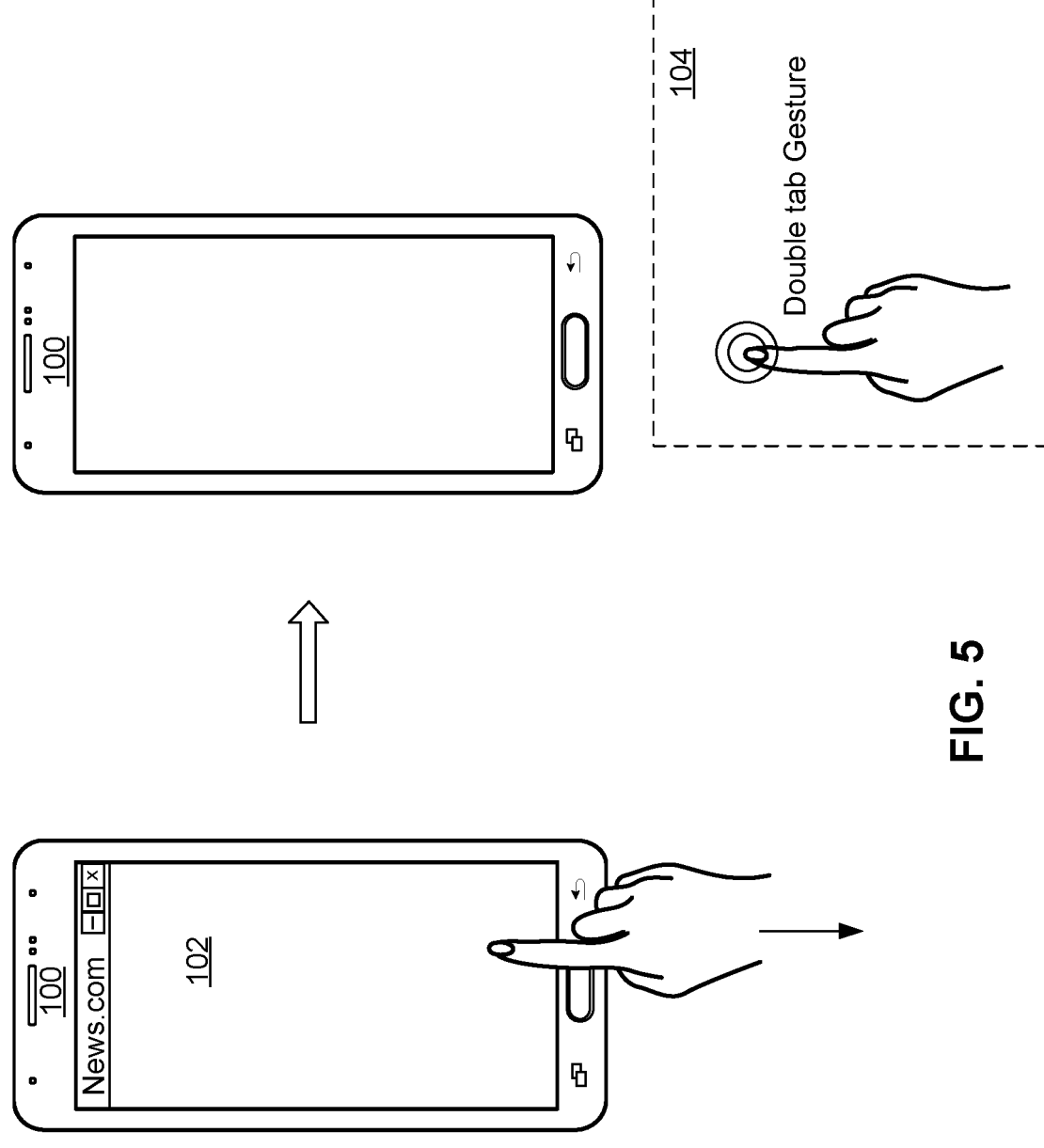
FIG. 5 illustrate an example use case for activating an application.

FIG. 5 illustrates a use case fora device 100. The device, e.g., a wireless device, comprises a touch detection area 102, one or more determining sensors 21, e.g., motion detection sensors, and processing circuitry. A user initiates browsing of a web page by scrolling down in the webpage and continuing below the touch detection area 102 into an activity domain 104 surrounding the device, i.e., excluding the touch detection area 102. The scrolling movement is continued outside the device 100 rather than on the touch detection area 102, activating at least one determining sensor 21 when transitioning over a perimeter 102a of the touch detection area 102. The user may continue the scrolling gesture when leaving the touch detection area 102 and moving below the device 100 into the activity domain 104.

As further disclosed in the use case of FIG. 5, the user may provide input to an application by double tapping in the activity domain 104. When the activity domain 104, i.e., extended touch detection area 102, has been activated, movements or gestures can be associated with interpretations having a meaning other than just tracking their position. A double tap in the air or towards a surface, e.g. when the device 100 is positioned on a table, can have a meaning similar to a mouse click or a tap on the touch detection area 102. Instead of a double tap, activation may of course also be performed by any other predetermined distinct movement, e.g., movement of one or multiple finger(s), a pen, or other pointing devices.

Figure 6:
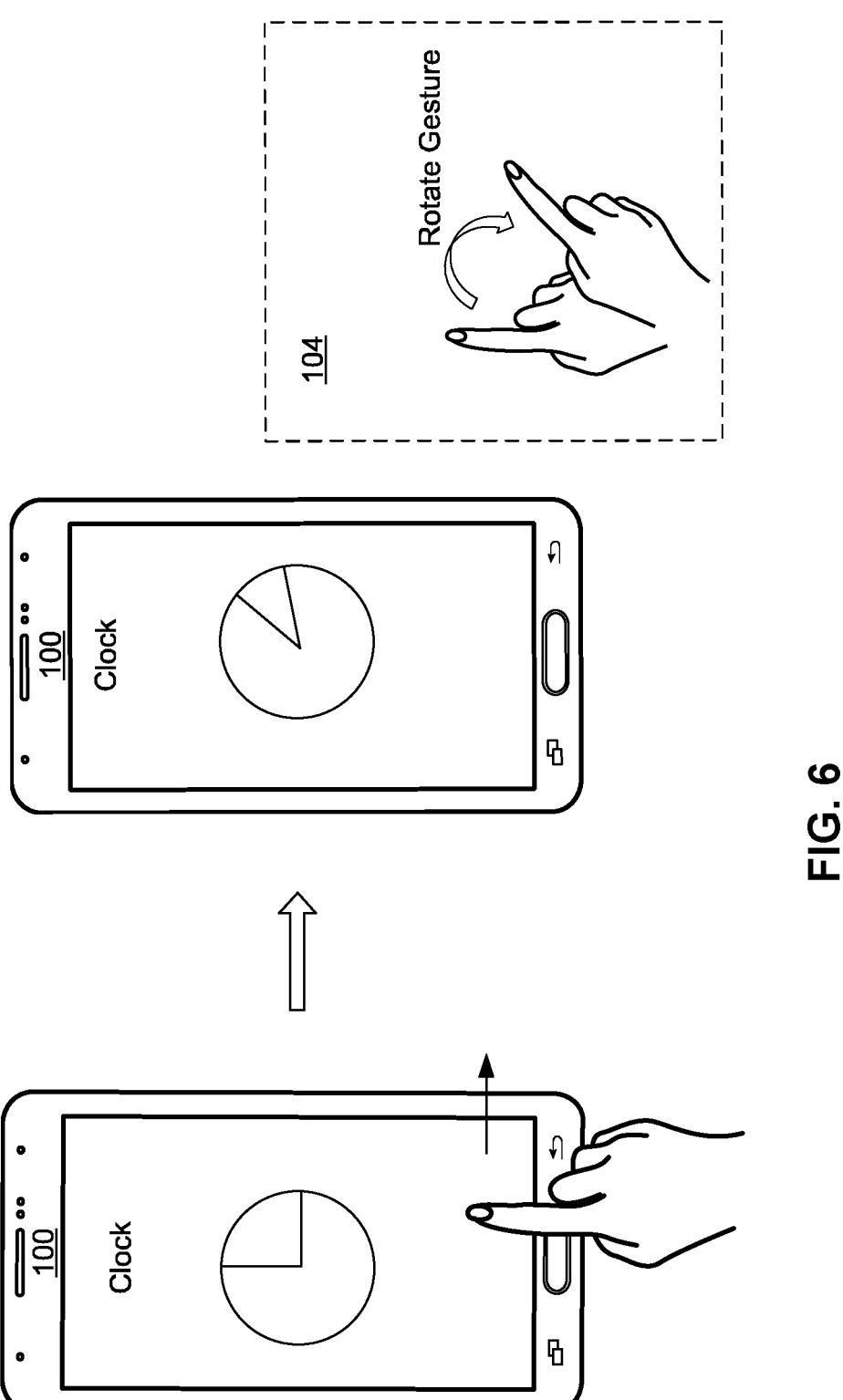
FIG. 6 illustrate another example use case for activating an application.

Turning to FIG. 6, alternatives to activation gestures are suggested. The determining sensors 21 may be configured to detect a large set of predetermined activation gestures to enable a variety of control operations using gestures in the activity domain 104.

Other use applications comprise gaming, e.g., when the user is playing a three-dimensional (3D) game, the motion detection sensors 21 at the front and/or back of the device 100, can measure distance, direction, and/or movement of one finger or several fingers in a plane above and/or behind the device so as to add depth control in the game. In some examples, the transitioning from the touch detection area 102 into the activity domain 104 may also comprise activating at least one connected device. Such a connected scenario may be applied to improve augmented reality capabilities by connecting an external device to the above mentioned device, e.g., by connecting a head mounted display (HMD) with augmented reality capabilities to the device; the device being provided as a smart watch or any other type of wireless device. User input in the form of pointing and/or scrolling in a 1D, 2D or 3D space may be provided. Starting an operation within the physical touch detection area 102 on the device, e.g., a watch, one or sensors in the touch detection area 102 may detect that user input, e.g., a finger being moved on the display upwards. When detecting user input at a perimeter 102a of the touch detection area 102, crossing the border into the activity domain 104 surrounding the watch, one or more determining sensors 21 are activated. This is an activation function for the menu of the HMD device, so that the menu now becomes visible for the user in the HMD. Movements in the activity domain 104, e.g., a 1D, 2D or 3D space around the watch, may then activate movements in the menu system, or applications, on the HMD. Gestures, or other motion activities around the watch may be presented in the HMD.

Figure 7:
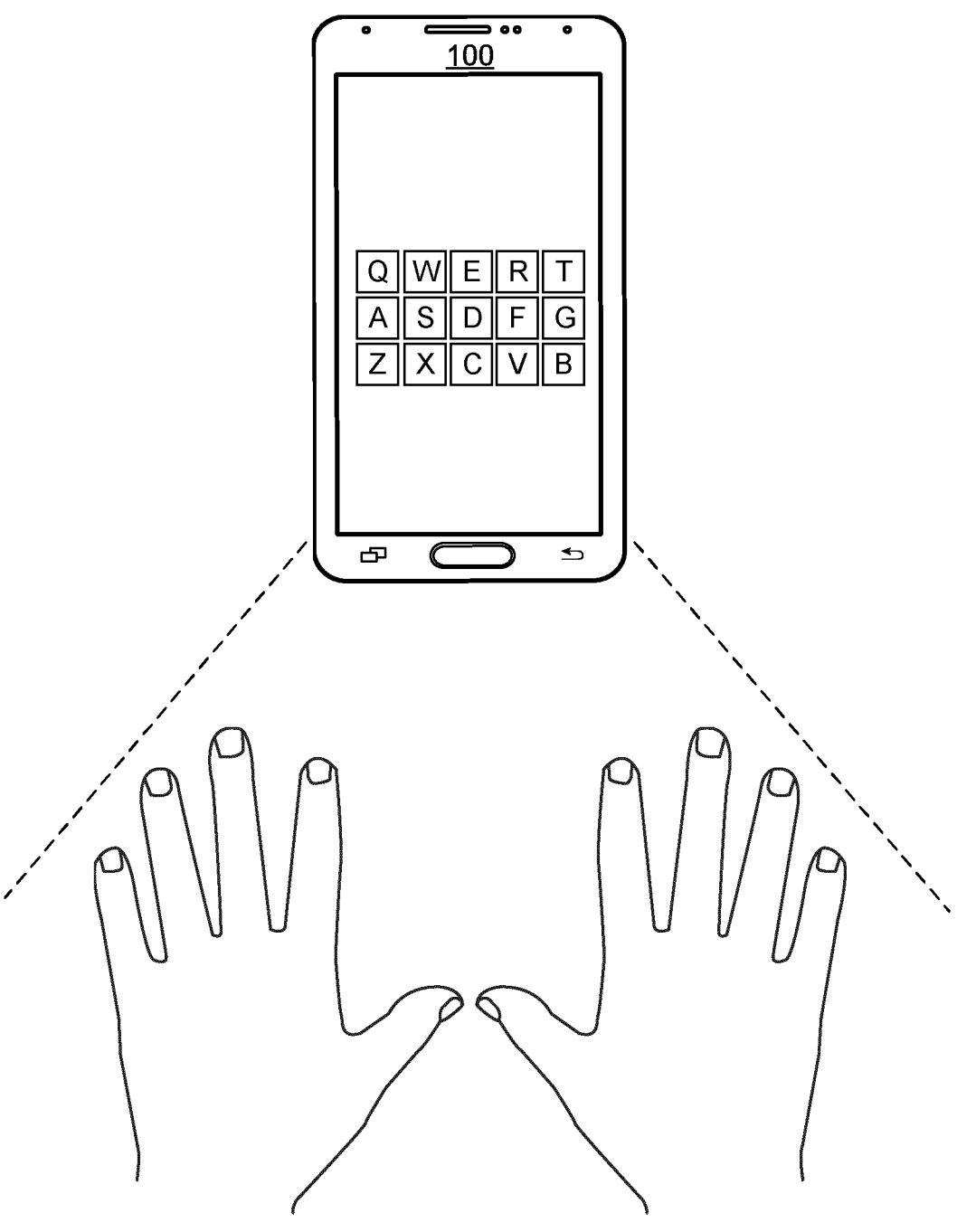
FIG. 7 illustrates an example use case of operating a virtual keyboard.

FIG. 7 discloses a use case when the activity domain 104 may be used to provide keyboard input. Placing the device, e.g., a wireless device, on a table and touching the device with left and right index fingers simultaneously on the centre of the touch detection area 102, then dragging each index finger to its respective left and right border and continuing to drag the fingers in the air out from the device 100, may activate a virtual keyboard. Using a plurality of determining sensors 21, the device 100 can detect when a finger hits the table and may also detect the distance to the hand and/or to unique fingers. Combining sensor data from a plurality of determining sensor 21, e.g., motion detection sensors, the device 100 may interpret the user input as keystrokes on a virtual keyboard. Thus, the virtual keyboard may be activated when the determining sensor 21 detect user input at a perimeter 102a of the touch detection area 102, e.g., finger movements outside the touch detection area 102. The determining sensors 21 are configured to capture user input, e.g., position and movement of fingers and to provide the user input to the processing circuitry to be interpreted as keyboard activities. In another use case, the motion detection could be interpreted as input from a keyboard on a virtual instrument resulting in sound input rather than text input.

Figure 8:
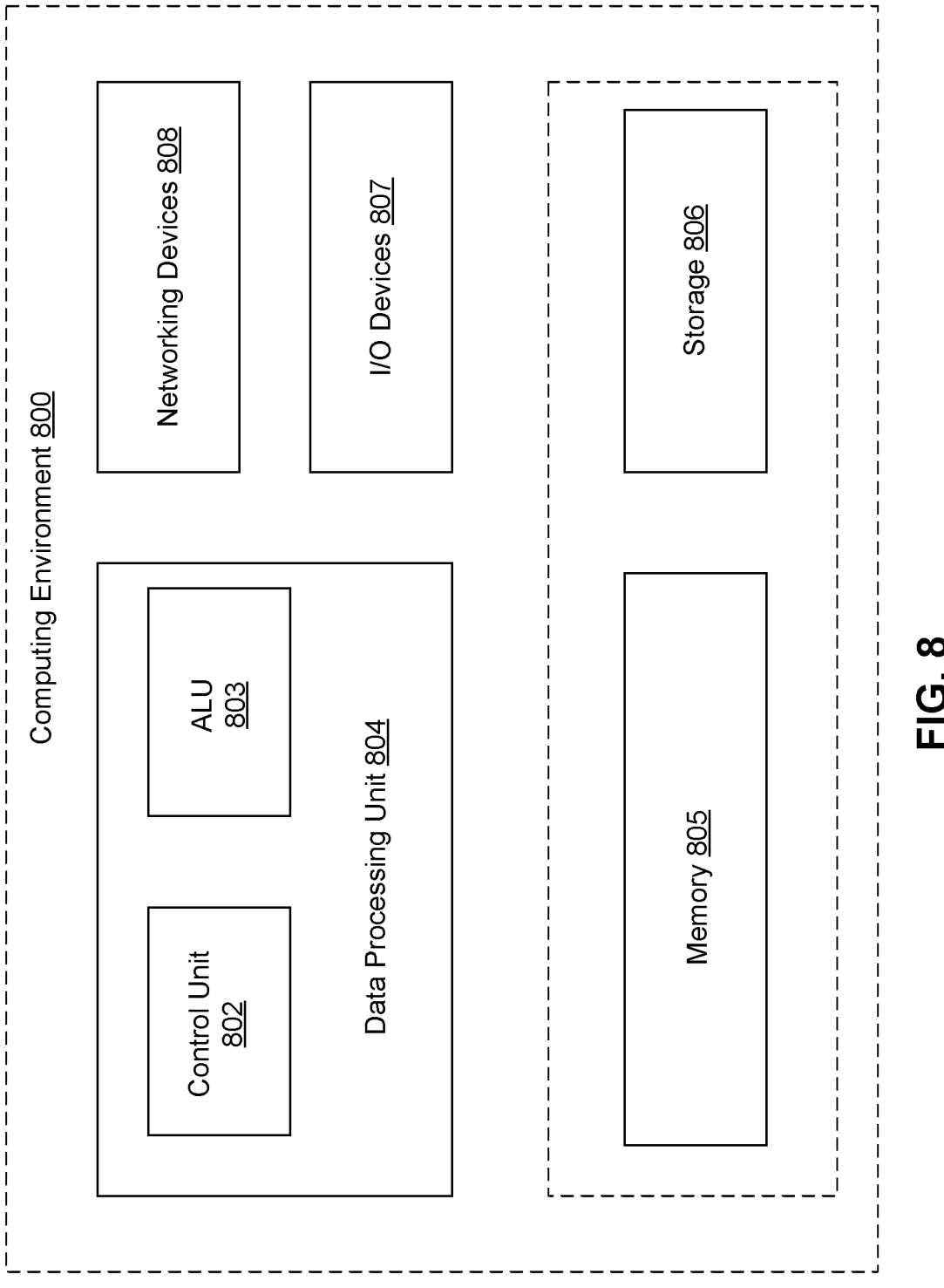
FIG. 8 illustrates an example computing environment.

FIG. 8 illustrates a computing environment 800 implementing the method and device for user control of device applications. As depicted the computing environment 800 comprises at least one data processing unit 804 that is equipped with a control unit 802 and an Arithmetic Logic Unit (ALU) 803, a memory 805, a storage unit 806, plurality of networking devices 808 and a plurality Input output (I/O) devices 807. The data processing unit 804 is responsible for processing the instructions of the algorithm. The data processing unit 804 receives commands from the control unit in order to perform its processing. Further, any logical and arithmetic operations involved in the execution of the instructions are computed with the help of the ALU 803.

The overall computing environment 800 can be composed of multiple homogeneous and/or heterogeneous cores, multiple CPUs of different kinds, special media and other accelerators. The data processing unit 804 is responsible for processing the instructions of the algorithm. Further, the plurality of data processing units 804 may be located on a single chip or over multiple chips.

The algorithm comprising of instructions and codes required for the implementation are stored in either the memory 805 or the storage 806 or both. At the time of execution, the instructions may be fetched from the corresponding memory 805 and/or storage 806, and executed by the data processing unit 804.

In case of any hardware implementations various networking devices 808 or external I/O devices 807 may be connected to the computing environment to support the implementation through the networking devices 808 and the I/O devices 807.

The embodiments disclosed herein can be implemented through at least one software program running on at least one hardware device and performing network management functions to control the elements. The elements shown in FIG. 8 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The invention claimed is:

1. A method for detecting and responding to a user input in a device comprising a touch detection area and one or more determining sensors arranged to determine a position or relative movement of the user input at least outside the touch detection area, the method comprising:

detecting the user input at a perimeter of the touch detection area, wherein the step of detecting user input at a perimeter of the touch detection area comprises receiving, from the touch detection area, information relating user activity in a direction toward a perimeter of the touch detection area;

activating the one or more determining sensors from a low energy state to a higher energy state, which is operative to determine position or relative movement of the user input, in response to detecting the user input at the perimeter of the touch detection area; and causing a seamless transition between the touch detection area and an activity domain excluding the touch detection area, wherein causing the seamless transition comprises:

i. when the detected user input transits out from the perimeter of the touch detection area into the activity domain, causing the device to respond to the user input performed in the activity domain and of which the position or the relative movement is determined by the one or more determining sensors; and ii. when the detected user input transits into the touch detection area from the activity domain, causing the device to respond to the user input performed in the touch detection area, and deactivating the one or more determining sensors from the higher energy state to the low energy state, wherein the step of causing seamless transition between the touch detection area and the activity domain comprises:

determining device associated intrinsic reference points for the detected user activity, wherein the device associated intrinsic reference points are determined in a device reference system relative to the touch detection area of the device and the user activity is a touch activity performed on the touch detection area;

mapping individual ones of the extrinsic reference points in the activity domain, determined using the one or more determining sensors, to respective ones of the intrinsic reference points based on a predefined functional correspondence between off-screen and on-screen input modalities, wherein the extrinsic reference points are comprised in the activity domain located outside the touch detection area of the device;

tracking user activity relative to the extrinsic reference points in the activity domain;

identifying respective ones of the intrinsic reference points that are mapped to the extrinsic reference points corresponding to the tracked user activity; and controlling an application in the device responsive to the identified respective ones of the intrinsic reference points that are mapped to the extrinsic reference points corresponding to the tracked user activity so as to effectuate a functionally continuous user interaction across the touch detection area and the activity domain.

2. The method of claim 1, wherein the device reference system comprises an intrinsic domain corresponding to the physical boundaries of the device and wherein the activity domain excludes the intrinsic domain.

3. The method of claim 1, further comprising associating the at least one intrinsic reference point to a respective finger or pointing device position on the touch detection area.

4. The method of claim 3, further comprising associating the at least one extrinsic reference point to a position of the respective finger or pointing device in the activity domain and activating the device to respond to user activity of the respective finger or pointing device.

5. The method of claim 1, further comprising:

enabling user control of one or more computer applications of the device based on user activity; and presenting the user activity on a display connected to the touch detection area.

6. The method of claim 1, further comprising:

activating at least one connected device in response to detecting a user activity in the activity domain, wherein the at least one connected device comprises a head mounted display (HMD) device with augmented reality capabilities to the device, and wherein activating the at least one connected device comprises activating a menu of the HMD device, so that the menu becomes visible for a user in the HMD device.

7. The method of claim 1, wherein the device reference system is a one-, two- or three-dimensional reference system.

8. The method of claim 1, wherein the touch detection area is a touch pad connected to a display.

9. The method of claim 1, wherein the touch detection area is comprised in a touch panel.

10. The method of claim 1, wherein user activity comprises web-browsing, list scrolling, moving a cursor on the display, and activating functionality associated with computer applications.

11. The method of claim 1, wherein the step of causing the device to respond to user input from the touch detection area comprises:

receiving, from the touch detection area, information relating to renewed user activity in the touch detection area; and de-activating the device from responding to user activity detected by the one or more motion detection sensors.

12. A computer program product comprising a non-transitory computer readable medium, having thereon a computer program comprising program instructions, the computer program being loadable into a processing circuitry and configured to cause execution of the method according to claim 1 when the computer program is run by the processing circuitry.

13. A device for detecting and responding to a user input, the device comprising a touch detection area, one or more determining sensors, and processing circuitry, wherein the processing circuitry is configured to perform operations comprising:

detecting the user input at a perimeter of the touch detection area, wherein the step of detecting user input at a perimeter of the touch detection area comprises receiving, from the touch detection area, information relating user activity in a direction toward a perimeter of the touch detection area;

activating the one or more determining sensors from a low energy state to a higher energy state, which is operative to determine position or relative movement of the user input, in response to detecting the user input at the perimeter of the touch detection area; and causing a seamless transition between the touch detection area and an activity domain excluding the touch detection area, wherein causing the seamless transition comprises:

i. when the detected user input transits out from the perimeter of the touch detection area into the activity domain, causing the device to respond to the user input performed in the activity domain and of which the position or the relative movement is determined by the one or more determining sensors; and ii. when the detected user input transits into the touch detection area from the activity domain, causing the device to respond to the user input performed in the touch detection area, and deactivating the one or more determining sensors from the higher energy state to the low energy state, wherein the operation to cause seamless transition between the touch detection area and the activity domain comprises to:

determine device associated intrinsic reference points for the detected user activity, wherein the device associated intrinsic reference points are determined in a device reference system relative to the touch detection area of the device and the user activity is a touch activity performed on the touch detection area;

map individual ones of the extrinsic reference points in the activity domain, determined using the one or more determining sensors, to respective ones of the intrinsic reference points based on a predefined functional correspondence between off-screen and on-screen input modalities, wherein the extrinsic reference points are comprised in the activity domain located outside the touch detection area of the device;

track user activity relative to the extrinsic reference points in the activity domain;

identify respective ones of the intrinsic reference points that are mapped to the extrinsic reference points corresponding to the tracked user activity; and control an application in the device responsive to the identified respective ones of the intrinsic reference points that are mapped to the extrinsic reference points corresponding to the tracked user activity so as to effectuate a functionally continuous user interaction across the touch detection area and the activity domain.

14. The device of claim 13, wherein the one or more determining sensors comprise motion detection sensors and are selected from a group of sensors comprising image detection sensors, radar sensors, lidar sensors, ultra-sonic sound detection sensors, and infrared light detection sensors.

15. The device of claim 13, further comprising a touch area and wherein the touch detection area is comprised in the touch panel.

16. The device of claim 13, wherein the device is a smartphone, a tablet, or a smart watch.

\* \* \* \* \*